(12) United States Patent
Tian

(10) Patent No.: US 12,049,196 B2
(45) Date of Patent: Jul. 30, 2024

(54) MULTIFUNCTIONAL CAR-TOP TRUNK

(71) Applicant: WUXI TIAN CHUANG JIA CHENG CULTURAL AND CREATIVE LTD., Jiangsu (CN)

(72) Inventor: Cheng Tian, Jiangsu (CN)

(73) Assignee: WUXI TIAN CHUANG JIA CHENG CULTURAL AND CREATIVE LTD., Jiangsu (CN)

( * ) Notice: Subject to any disclaimer, the term of this patent is extended or adjusted under 35 U.S.C. 154(b) by 0 days.

(21) Appl. No.: 18/425,200

(22) Filed: Jan. 29, 2024

(65) Prior Publication Data

US 2024/0166139 A1     May 23, 2024

Related U.S. Application Data

(63) Continuation of application No. PCT/CN2023/124789, filed on Oct. 16, 2023.

(30) Foreign Application Priority Data

Oct. 17, 2022    (CN) .......................... 202211284580.2
Apr. 18, 2023    (CN) .......................... 202320871748.3

(51) Int. Cl.
    *B60R 9/055*      (2006.01)
    *B60R 9/058*      (2006.01)
    *B60R 16/08*      (2006.01)

(52) U.S. Cl.
    CPC .............. *B60R 9/055* (2013.01); *B60R 9/058* (2013.01); *B60R 16/08* (2013.01)

(58) Field of Classification Search
    CPC ............ B60R 9/055; B60R 9/04; B60R 9/058
              (Continued)

(56) References Cited

U.S. PATENT DOCUMENTS

3,265,262 A *   8/1966   Motsinger ............... E03B 11/04
                                             280/830
3,696,979 A *   10/1972   Erickson ................... B60R 9/04
                                             280/834

(Continued)

FOREIGN PATENT DOCUMENTS

CN         203864583 U     10/2014
CN         206264932 U      6/2017
                (Continued)

OTHER PUBLICATIONS

International Search Report cited in PCT/CN2023/124789, mailed Dec. 14, 2023, 4 pages.

*Primary Examiner* — Justin M Larson
(74) *Attorney, Agent, or Firm* — Cooper Legal Group, LLC

(57) ABSTRACT

A multifunctional car-top trunk, relating to the technical field of car-top trunk, includes an upper cover, a lower cover, and a connector configured for connecting the upper cover and the lower cover, the multifunctional car-top trunk further includes a water storage structure in the lower cover, the water storage structure includes a water storage container in the lower cover and pipes, the water storage container is connected with two pipe sockets configured to be detachably connected to the pipes, and the pipes are connected with a water pump, the car-top trunk further includes a battery pack in the lower cover, the upper cover and/or the lower cover are/is provided with a lighting strip, and the lighting strip is connected to the battery pack.

13 Claims, 12 Drawing Sheets

(58) Field of Classification Search
USPC .................................................. 224/328, 329
See application file for complete search history.

(56) References Cited

U.S. PATENT DOCUMENTS

| | | | | |
|---|---|---|---|---|
| 4,974,766 | A * | 12/1990 | DiPalma | B60R 9/055 224/315 |
| 5,931,359 | A * | 8/1999 | Zona | B60R 9/052 224/322 |
| 6,679,673 | B1 * | 1/2004 | Stahler | B60P 1/5471 414/467 |
| 8,225,436 | B1 * | 7/2012 | Cotton | B60R 15/02 4/597 |
| 8,534,518 | B2 * | 9/2013 | Shen | B60R 9/045 224/322 |
| 9,629,508 | B2 * | 4/2017 | Cotton | B60R 11/00 |
| 11,667,246 | B1 * | 6/2023 | Baca | B60R 15/02 4/596 |
| 2004/0086365 | A1 * | 5/2004 | Stahler | B60R 9/055 414/467 |
| 2005/0217018 | A1 * | 10/2005 | Ebbe | B60P 3/22 4/616 |
| 2019/0092248 | A1 | 3/2019 | Cotton | |

FOREIGN PATENT DOCUMENTS

| | | | |
|---|---|---|---|
| CN | 109532690 | A | 3/2019 |
| CN | 215322292 | U | 12/2021 |
| CN | 218141305 | U | 12/2022 |
| CN | 115593315 | A | 1/2023 |
| CN | 219360949 | U | 7/2023 |
| JP | H0840151 | H | 2/1996 |

* cited by examiner

US 12,049,196 B2

MULTIFUNCTIONAL CAR-TOP TRUNK

CROSS-REFERENCE TO RELATED APPLICATION

This application is a continuation of PCT application serial no. PCT/CN2023/124789, filed on Oct. 16, 2023, which claims the priorities and benefits of Chinese patent application serial no. 202211284580.2, filed on Oct. 17, 2022 and Chinese patent application serial no. 202320871748.3, filed on Apr. 18, 2023. The entireties of PCT application serial no. PCT/CN2023/124789, Chinese patent application serial no. 202211284580.2, and Chinese patent application serial no. 202320871748.3 are hereby incorporated by reference herein and made a part of this specification.

TECHNICAL FIELD

The present application relates to the technical field of car-top trunk, and in particular, relates to a multifunctional car-top trunk.

BACKGROUND ART

With the development of people's life, more and more people like to go camping outdoors. In order to prevent camping equipment from occupying too much interior space, the camping equipment commonly are put in the car-top trunk.

Currently, most of the car-top trunks have a single function, which mainly have storage function. However, the car-top trunk cannot meet the other conditions for camping, such as water, therefore, a container for containing water needs to be prepared separately when people travel, which is inconvenient for camping outdoors of people. Therefore, for the related field, a car-top trunk capable of carrying water needs to be researched.

SUMMARY

In order to bring convenience for camping outdoors of people, the present application provides a multifunctional car-top trunk.

The multifunctional car-top trunk of the present application adopts the following technical solution:

A multifunctional car-top trunk includes an upper cover, a lower cover, and a connector configured for connecting the upper cover and the lower cover, wherein the multifunctional car-top trunk further includes a water storage structure in the lower cover, the water storage structure includes a water storage container in the lower cover and pipes, the water storage container is connected with two pipe sockets configured to be detachably connected to the pipes, and the pipes are connected with a water pump.

In an embodiment, the multifunctional car-top further includes a battery pack in the lower cover, wherein the upper cover and/or the lower cover are/is provided with a lighting strip, and the lighting strip is connected to the battery pack.

In an embodiment, the connector includes a hinge structure, a first electric push rod and an electromagnetic lock, a first end of the upper cover is connected to a first end of the lower cover through the hinge structure, a second end of the upper cover is connected to a second end of the lower cover through an electromagnetic lock, the electromagnetic lock is electrically connected to the battery pack, a first end of the first electric push rod is hinged with the lower cover, and a second end of the first electric push rod is hinged with the upper cover.

In an embodiment, the hinge structure includes an upper mounting plate at the upper cover, a lower mounting plate at the lower cover, a connecting rod I, a connecting rod II, a connecting rod III, a connecting rod IV and a linkage rod at the upper mounting plate, an intermediate part of the connecting rod II is hinged with an intermediate part of the connecting rod III, a first end of the connecting rod I is hinged with a first end of the connecting rod II, a second end of the connecting rod I is hinged with the lower mounting plate, a second end of the connecting rod II departing from the connecting rod I is hinged with a first end of the linkage rod, a first end of the connecting rod III is hinged with a first end of the connecting rod IV, a second end of the connecting rod III is hinged with the lower mounting plate, and a second end of the connecting rod IV departing from the connecting rod III is hinged with a second end of the linkage rod departing from the connecting rod II.

In an embodiment, the connector includes a first link bar, a second link bar, a first scissor arm, and a second scissor arm, the first link bar is provided at the upper cover, the second link bar is provided at the lower cover, the first scissor arm is hinged with the second scissor arm, both the first link bar and the second link bar are respectively configured with a kidney slot, a first end of the first scissor arm is hinged with the first link bar, a second end of the first scissor arm is connected with a first sliding column, the first sliding column is slidably inserted in the kidney slot of the second link bar, a first end of the second scissor arm is hinged with the second link bar, a second end of the second scissor arm is connected with a second sliding column, and the second sliding column is slidably inserted in the kidney slot of the first link bar.

In an embodiment, the multifunctional car-top trunk further includes a universal support leg configured for mounting the car-top trunk, the universal support leg includes a third connecting block configured to be connected to the car-top trunk, a fourth connecting block configured to be connected to a luggage rail at a top of the vehicle, a first adjusting arm and a second adjusting arm, the first adjusting arm is hinged with the second adjusting arm, the first adjusting arm is hinged with the third connecting block, the second adjusting arm is hinged with the fourth connecting block, a locating element is connected to the first adjusting arm and the second adjusting arm, the locating element includes a first telescopic rod, a second telescopic rod and a third telescopic rod, a first end of the first telescopic rod is hinged with the third connecting block, a second end of the first telescopic rod is hinged with the second adjusting arm, a first end of the second telescopic rod is hinged with the fourth connecting block, a second end of the second telescopic rod is hinged with the first adjusting arm, a first end of the third telescopic rod is hinged with the first adjusting arm, and a second end of the third telescopic rod is hinged with the second adjusting arm.

In summary, at least one of the following beneficial technical effects is realized:

1. The car-top trunk is provided with the water storage structure configured for storing water, when driving, the pipes are connected to the pipe sockets, one pipe is used as an inlet pipe, and the other is used as an outlet pipe. Water is injected into the water storage container through the inlet pipe, so that it is not necessary to prepare a separate container for containing water, which is conductive for camping outdoors. When the water stored in the water storage container is used, the outlet pipe is connected to the pipe socket, when the water pump is started, the water in the water storage container can be taken out, which is conductive for people to take water.

2. The battery pack is provided, such that the car-top trunk carries a portable power source, which provides power supply for people when camping outdoors, and further brings convenience to camping outdoors.
3. The lighting strip is cooperated with the battery pack, such that light shines around the car-top trunk, which not only illustrates the surrounding of the car-top trunk, but also improves the atmosphere around the car-top trunk, thereby improving the atmosphere when camping outdoors.
4. When in use, the limits of the relative position between the first adjusting arm and the second adjusting arm, the relative position between the third connecting block and the second adjusting arm, and the relative position between the fourth connecting block and the first adjusting arm by the locating element are released, so that the first adjusting arm can move relative to the second adjusting arm, the third connecting block can move relative to the second adjusting arm, and the fourth connecting block can move relative to the first adjusting arm. After the first link bar is connected to the car-top trunk, the relative position between the first adjusting arm and the second adjusting arm, the relative position between the third connecting block and the second adjusting arm, and the relative position between the fourth connecting block and the first adjusting arm are adjusted, so that the second adjusting arm can be smoothly connected on the luggage rail at the top of a vehicle. And then the relative position between the first adjusting arm and the second adjusting arm, the relative position between the third connecting block and the second adjusting arm, and the relative position between the fourth connecting block and the first adjusting arm are positioned by the locating element, to mount the car-top trunk. During the installation process, the position of the fourth connecting block can be adjusted according to the position of the luggage rail at the top of the vehicle, so that the car-top trunk can be mounted on the vehicles with different distances between the luggage rails, which has wide application range and compatibility variety of adaptability with vehicles.

DETAILED DESCRIPTION

The embodiment of the present application discloses a multifunctional car-top trunk.

Embodiment 1

Figure 1:
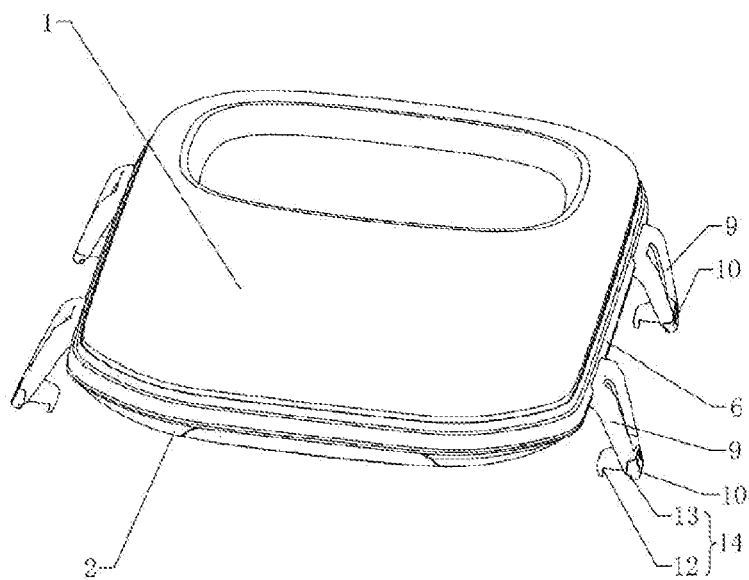
FIG. 1 is a schematic structural view for illustrating the multifunctional car-top trunk according to Embodiment 1 of the present application when it is closed.
Figure 2:
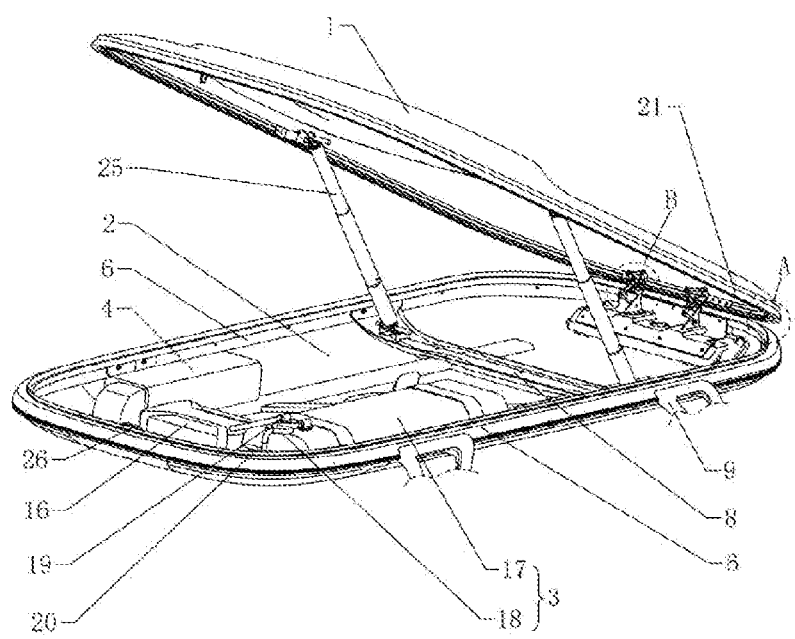
FIG. 2 is a schematic structural view for illustrating the multifunctional car-top trunk according to Embodiment 1 of the present application when it is opened.
Figure 3:
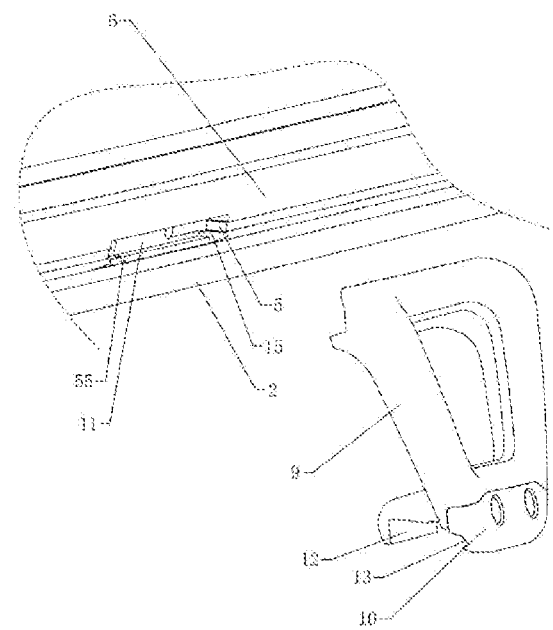
FIG. 3 is a schematic structural view for illustrating the positional relationship between a positioning groove and a snapping groove according to Embodiment 1 of the present application.

Referring to FIGS. 1-3, a multifunctional car-top trunk includes an upper cover 1, a lower cover 2, a connector configured for connecting the upper cover 1 and the lower cover 2, a water storage structure 3 configured for storing water, a battery pack 4 and a lighting strip 5.

Figure 4:
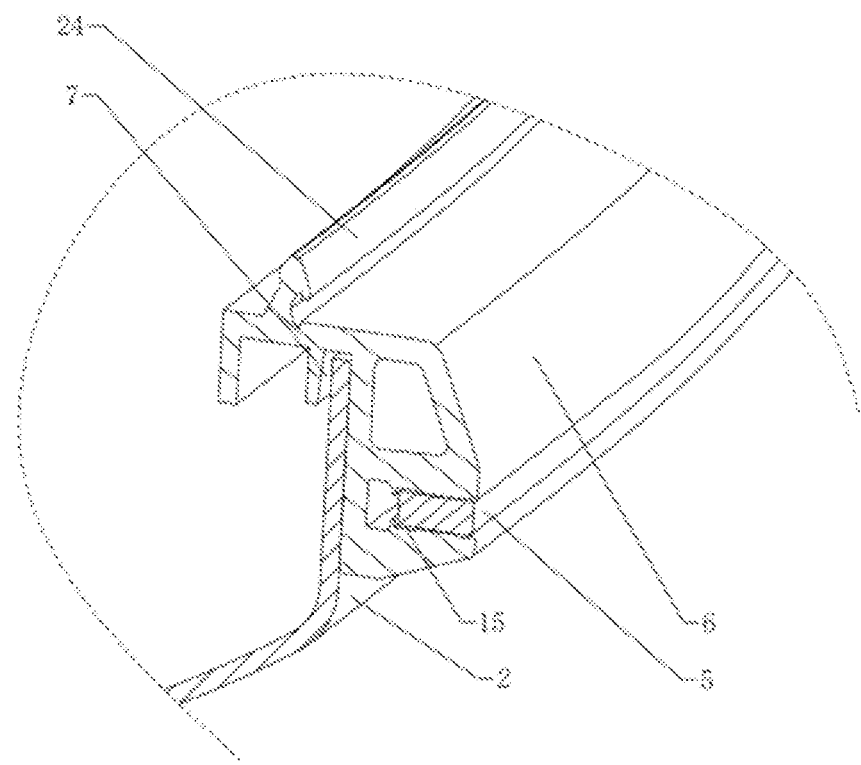
FIG. 4 is a schematic structural view for illustrating the positional relationship between the lighting strip and the lower aluminum alloy frame according to Embodiment 1 of the present application.

Referring to FIGS. 2-4, the peripheral edge of the lower cover 2 is connected with a lower aluminum alloy frame 6, a clamping groove 7 is defined at the lower aluminum alloy frame 6, the lower aluminum alloy frame 6 and the edge of the lower cover 2 are engaged with each other through the clamping groove 7, the lower aluminum alloy frame 6 is connected with the lower cover 2 via a rivet (not shown in figures), and a reinforcing plate 8 configured for maintaining the shape of the lower cover 2 is connected inside the lower cover 2.

Figure 5:
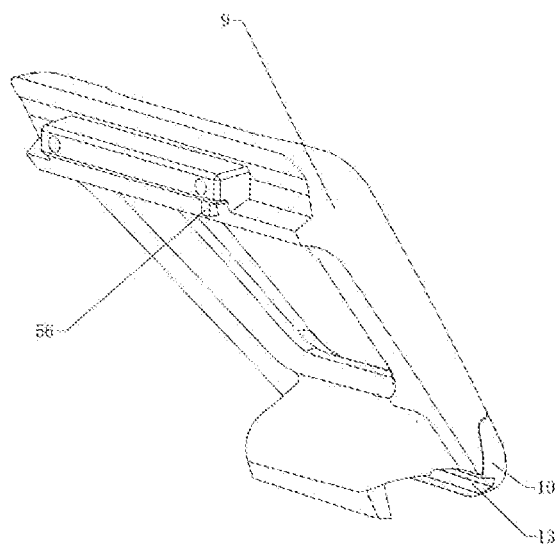
FIG. 5 is a schematic structural view for illustrating the gripper according to Embodiment 1 of the present application.

Referring to FIG. 2, FIG. 3 and FIG. 5, two opposite sides of the lower cover 2 on its outside each are connected with a gripper on the outside of the lower cover, which is configured for mounting the car-top trunk on the luggage carrier at the top of the vehicle. The gripper includes a gripper body 9 and a gripper block 10, the gripper body 9 is detachably connected to the lower cover 2 via screws (not shown in figures). The lower aluminum alloy frame 6 is configured with a snapping groove 11 matched with the gripper body 9, and the lower aluminum alloy frame 6 is further configured with a positioning groove 55. The gripper body 9 is integrally formed with a positioning block 56, the gripper body 9 is clamped in the snapping groove 11, the positioning block 56 is inserted in the positioning groove 55, and the screws successively pass through the reinforcing plate 8, the lower cover 2 and the lower aluminum alloy frame 6 and is screwed to the gripper body 9.

Referring to FIG. 1, FIG. 3 and FIG. 5, a first half-groove 12 is defined at an end of the gripper body 9 departing from the lower aluminum alloy frame 6, and the gripper block 10 is detachably connected to the end of the gripper body 9 departing from the lower aluminum alloy frame 6 via rivets. A second half-groove 13 is defined on the gripper block 10, and the first half-groove 12 and the second half-groove 13 are opposite each other, and form together a mounting groove 14 for gripping the luggage carrier on the top of the vehicle. The shape and the size of the mounting groove 14 can be designed according to concrete demands.

During the installation process, the gripper body 9 is placed on the luggage carrier at the top of the vehicle, in particular, the first half-groove 12 is located above the luggage carrier and grips a part of the luggage carrier, and then the gripper block 10 is mounted on the gripper body 9 via screws; meanwhile, the second half-groove 13 grips a part of the luggage carrier departing from the first half-groove 12, the first half-groove 12 and the second half-groove 13 form together the mounting groove 14. The gripper is engaged with the luggage carrier via the mounting groove 14, so as to mount the car-top trunk on the luggage carrier at the top of the vehicle.

Referring to FIGS. 2-4, alighting strip 5 is provided at the upper cover 1 and/or the lower cover 2. In this embodiment, the lighting strip 5 is provided at the lower cover 2. A groove for lighting strip 15 is defined at the peripheral edge of the lower aluminum alloy frame 6, and the groove for lighting strip 15 is in communication with the snapping groove 11. Two opposite sidewalls of the groove for lighting strip 15 are provided with sawteeth. The lighting strip 5 is a lighting strip made of silicone, which is inserted in the groove for lighting strip 15 in an interference fit manner, and abuts against the sidewalls of the groove for lighting strip 15 with sawteeth. The sawteeth at the sidewalls of the groove for lighting strip 15 has anti-slip effect, which can improve the stability of the lighting strip 5 in the groove for lighting strip 15. A controller 16 is provided in the lower cover 2, and the lighting strip 5 is electrically connected to the controller 16.

Referring to FIGS. 2-3, the battery pack 4 is provided in the lower cover 2. In this embodiment, the battery pack 4 is placed in the lower cover 2, and can be taken out and used separately. In another embodiment, the battery pack 4 can also be fixed or detachably connected in the lower cover 2. The battery pack 4 is electrically connected to the controller 16. The battery pack 4 supplies power for the lighting strip 5.

Figure 6:
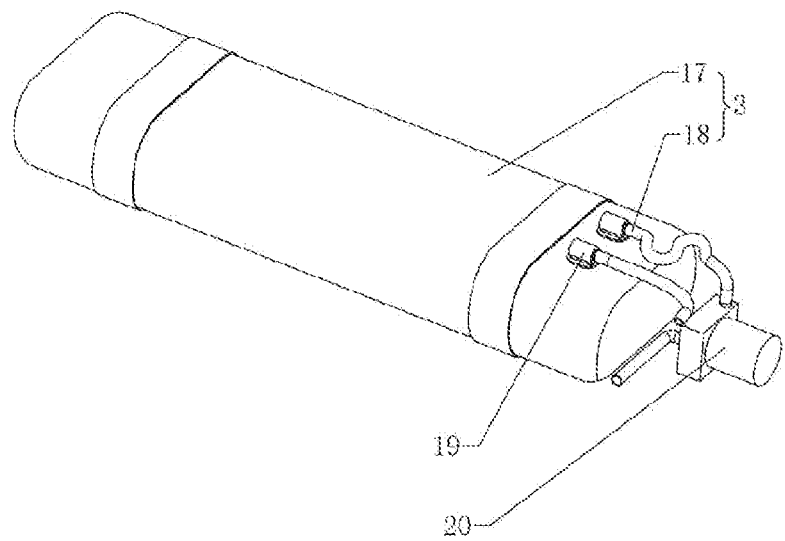
FIG. 6 is a schematic structural view for illustrating the water storage structure according to Embodiment 1 of the present application.

Referring to FIG. 2 and FIG. 6, the water storage structure 3 is located in the lower cover 2, which includes a water storage container 17 provided in the lower cover 2 and pipes 18. In this embodiment, the water storage container 17 is provided in the lower cover 2, and the water storage container 17 can also be taken out and used separately. In another embodiment, the water storage container 17 can also be fixed or detachably connected in the lower cover 2. The water storage container 17 can be a water tank, a sink, a water bag, etc. In this embodiment, the water storage container 17 is a water bag. The water storage container 17 is connected with two pipe sockets 19, the pipe socket 19 can be detachably connected to the pipe 18, and the length of the pipe 18 can be determined according to demand. In this embodiment, the pipe 18 is a hose, the pipe socket 19 is a connection structure between the hose and the container, which is an existing technique and will not be repeated here. One of the two pipes 18 is configured as an inlet pipe, and the other thereof is configured as an outlet pipe. The pipe 18 configured as an outlet pipe is connected with a water pump 20 which is detachably connected in the lower cover 2 via screws, and the water pump 20 is a water pump with a pressure switch, which is an existing technique and will not be repeated here.

Figure 7:
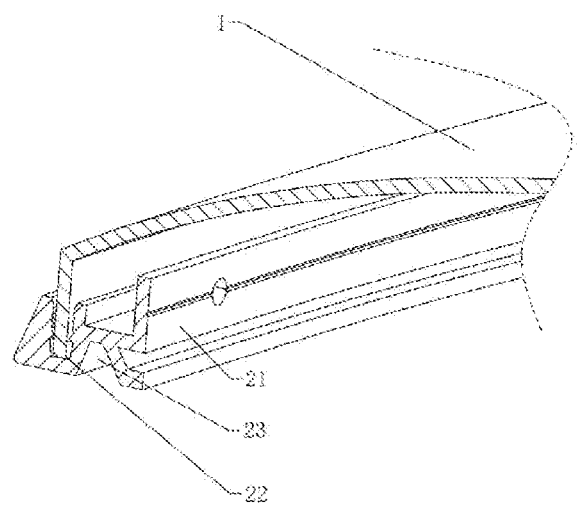
FIG. 7 is a schematic structural view for illustrating the positional relationship between the upper cover and the upper aluminum alloy frame according to Embodiment 1 of the present application.

Referring to FIG. 2 and FIG. 7, the peripheral edge of the upper cover 1 is connected with an upper aluminum alloy frame 21, and a recess 22 is defined at the upper aluminum alloy frame 21. The edge of the upper cover 1 is inserted in the recess 22, and the upper aluminum alloy frame 21 is connected to the upper cover 1 via rivets.

Figure 8:
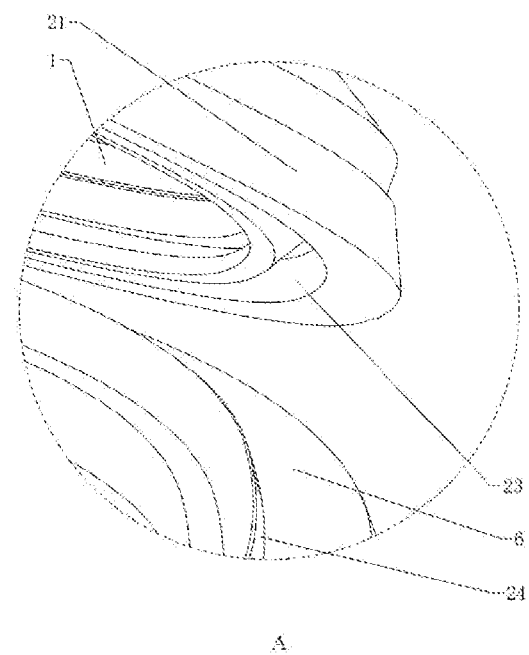
FIG. 8 is an enlarged view of portion A in FIG. 2.

Referring to FIG. 2 and FIG. 8, a sealing groove 23 is defined on the upper aluminum alloy frame 21, and a sealing strip 24 is provided on the lower aluminum alloy frame 6. The sealing strip 24 is integrated with the lower aluminum alloy frame 6. When the upper cover 1 and the lower cover 2 are closed, the sealing strip 24 is inserted in the sealing groove 23, thereby improving the sealing performance between the upper cover 1 and the lower cover 2.

Referring to FIG. 2, the connector includes a hinge structure, a first electric push rod 25 and an electromagnetic lock 26. The upper cover 1 is connected to the lower cover 2 at an end through the hinge structure, and connected to the lower cover through the electromagnetic lock 26 at the other end. The electromagnetic lock is electrically connected to the controller 16.

Figure 9:
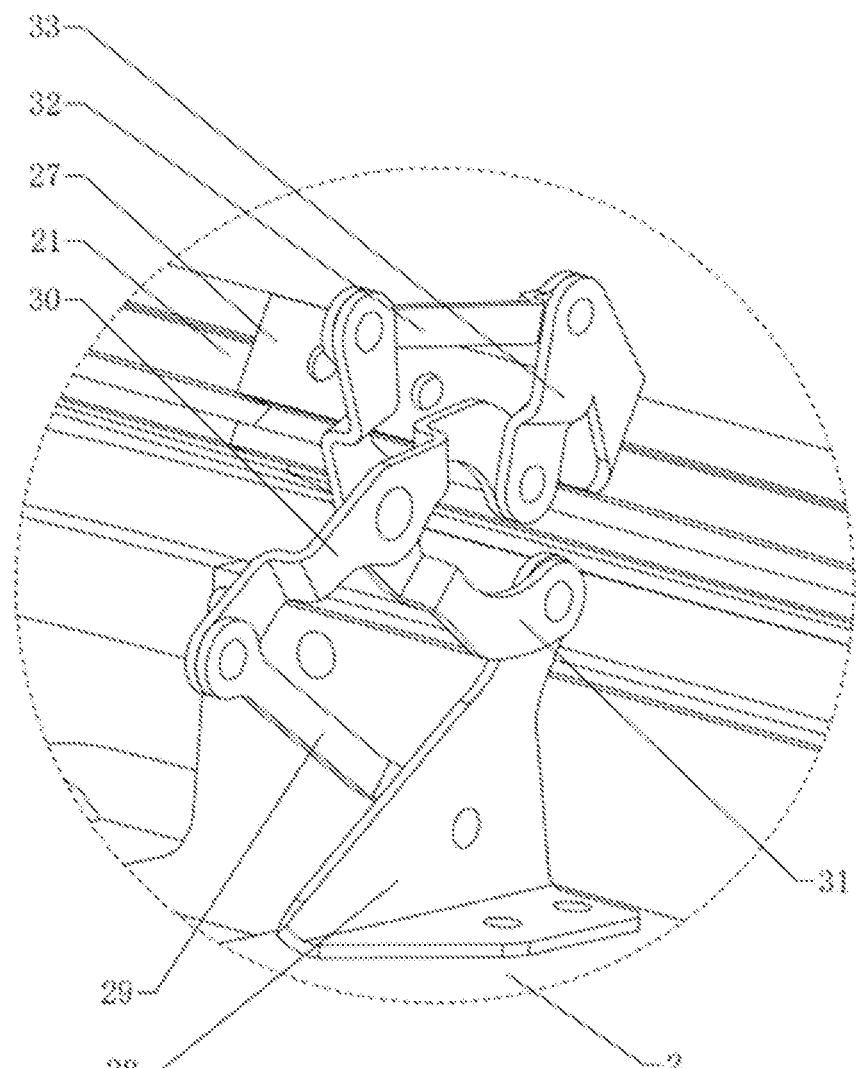
FIG. 9 is an enlarged view of portion B in FIG. 2.
Figure 10:
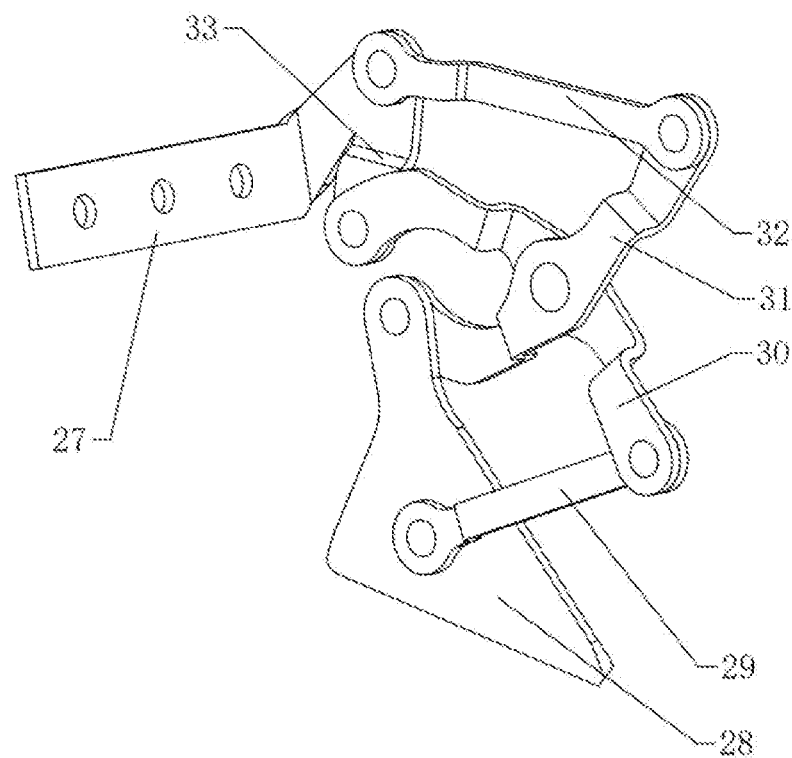
FIG. 10 is a schematic structural view for illustrating the hinge structure according to Embodiment 1 of the present application.

Referring to FIGS. 9-10, the hinge structure includes an upper mounting plate 27, a lower mounting plate 28, a connecting rod I 29, a connecting rod II 30, a connecting rod III 31, a connecting rod IV 32 and a linkage rod 33, in particular, the upper mounting plate 27 is provided at the upper aluminum alloy frame 21, the linkage rod 33 is provided at the upper mounting plate 27, the linkage rod 33 is integrated with the upper mounting plate 27, the lower mounting plate 28 is provided at the lower cover 2, and the intermediate part of the connecting rod II 30 is hinged with the intermediate part of the connecting rod III 31. An end of the connecting rod I 29 is hinged with an end of the connecting rod II 30, and the other end of the connecting rod I 29 is hinged with the lower mounting plate 28. An end of the connecting rod II 30 departing from the connecting rod I 29 is hinged with the linkage rod 33. An end of the connecting rod III 31 is hinged with the connecting rod IV 32, and the other end thereof is hinged with the lower mounting plate 28. An end of the connecting rod IV 32 departing from the connecting rod III 31 is hinged with an end of linkage rod 33 departing from the connecting rod II 30.

Referring to FIG. 2, the first electric push rod 25 is hinged with the reinforcing plate 8 of the lower cover 2, and the first electric push rod 25 is hinged on the upper aluminum alloy frame 21. The first electric push rod 25 is located in the car-top trunk, and the first electric push rod 25 is electrically connected to the controller 16. The first electric push rod 25 is the push rod of the automobile electric tail gate.

The implementation principle of Embodiment 1 of the present application is as follows. When driving, the pipe 18 is connected to the pipe socket 19, water is injected into the water storage container 17 through the pipe configured as the inlet pipe 18, so that it is not necessary to prepare a separate container for containing water. The battery pack 4 is provided, such that the car-top trunk carries a portable power source, which provides power supply for people. The lighting strip 5 is cooperated with the battery pack 4, such that light shines around the car-top trunk, which not only illustrates the surrounding of the car-top trunk, but also adjusts the atmosphere. Compared with the car-top trunk with the storage function only, the car-top trunk of the present application is multifunctional, which is convenient for camping outdoors.

When the car-top trunk needs to be opened, the electromagnetic lock 26 is opened first, and then the first electric push rod 25 is started, such that the first electric push rod 25 applies force on the upper cover 1 and cooperates with the hinge structure, so as to change the relative position between the upper cover 1 and the lower cover 2. At the same time, the upper mounting plate 27 moves upward first, and the linkage rod 33 synchronously moves with the upper mounting plate 27, so that the connecting rod I 29, the connecting rod II 30, the connecting rod III 31, the connecting rod IV and the linkage rod 33 move relative to each other, which results in the constant changing of the relative position between the upper cover 1 and the lower cover 2, thereby opening the upper cover 1 and in turn opening the car-top trunk.

Embodiment 2

Figure 11:
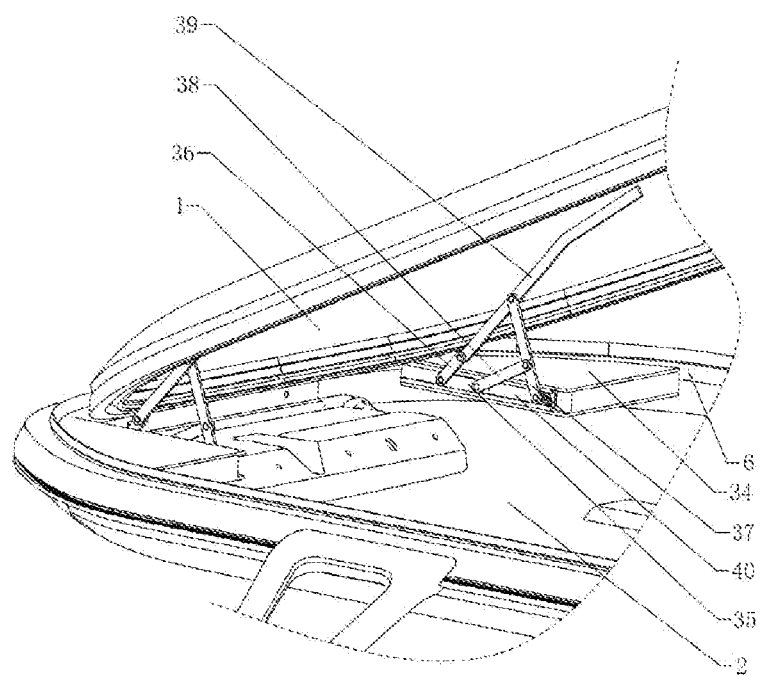
FIG. 11 is a schematic structural view for illustrating the hinge structure according to Embodiment 2 of the present application.

Referring to FIG. 11, the difference between this embodiment and Embodiment 1 is that the hinge structure includes a fixing plate 34, a sliding block 35, a first hinge rod 36, a second hinge rod 37, a third hinge rod 38 and a driving rod 39. The fixing plate 34 is provided at the lower aluminum alloy frame 6, the sliding block 35 is slidingly connected to the fixing plate 34, the fixing plate 34 is connected with a sliding rail 40, and the sliding block 35 is slidingly connected to the sliding rail 40. An end of the first hinge rod 36 is hinged with the sliding block 35, and the other end thereof is hinged with the driving rod 39, an end of the driving rod 39 departing from the first hinge rod 36 is fixedly connected to the upper cover 1. An end of the second hinge rod 37 is hinged with the sliding rail 40 at the fixing plate 34, and the other end thereof is hinged with the driving rod 39. An end of the third hinge rod 38 is hinged with an end of the sliding block 35 departing from the first hinge rod 36, and the other end thereof is hinged with the second hinge rod 37.

The implementation principle of Embodiment 2 of the present application is as follows. During opening the car-top trunk, the upper cover 1 drives the driving rod 39 to move, the driving rod 39 drives the first hinge rod 36 and the second hinge rod 37 to move during its movement, the second hinge rod 37 moves relative to the third hinge rod 38, and the sliding block 35 moves, thereby continuously changing the relative position between the upper cover 1 and the lower cover 2, so as to open the car-top trunk.

Embodiment 3

Figure 12:
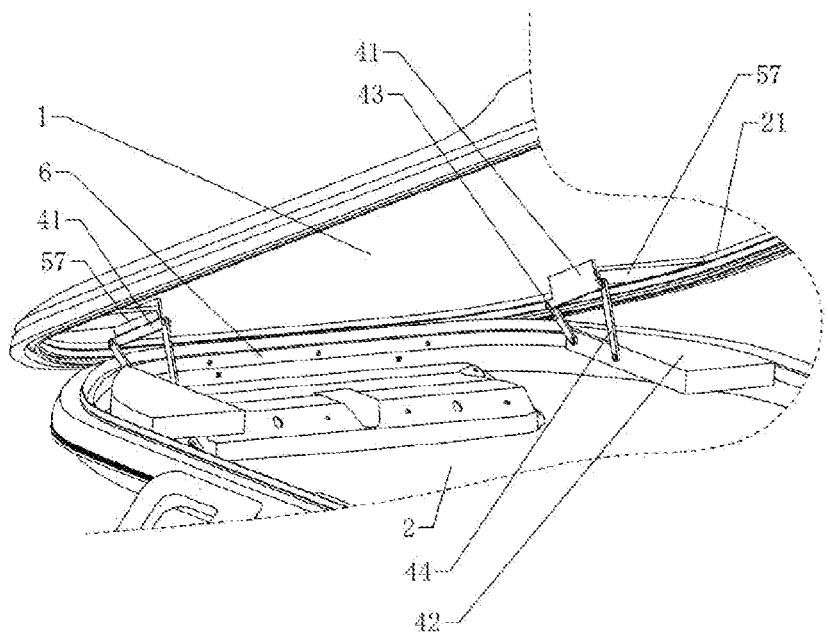
FIG. 12 is a schematic structural view for illustrating the hinge structure according to Embodiment 3 of the present application.

Referring to FIG. 12, the difference between this embodiment and Embodiment 1 is that the hinge structure includes a connecting plate 41, a mounting base 42, a fourth hinge rod 43 and a fifth hinge rod 44. The connecting plate 41 is connected to the upper aluminum alloy frame 21 of the upper cover 1 through an intermediate plate 57, and the mounting base 42 is connected to the lower aluminum alloy frame 6 of the lower cover 2. An end of the fourth hinge rod 43 is hinged with the connecting plate 41, and the other end thereof is hinged with the mounting base 42. An end of the fifth hinge rod 44 is hinged with the connecting plate 41, and the other end thereof is hinged with the mounting base 42. The length of the fifth hinge rod 44 is greater than that of the fourth hinge rod 43, the fourth hinge rod 43 is located between the fifth hinge rod 44 and an end of the lower cover 2 close to the fifth hinge rod 44.

The implementation principle of Embodiment 3 of the present application is as follows. When the car-top trunk is opened, the upper cover 1 drives the fourth hinge rod 43 and the fifth hinge rod 44 to move during the opening, thereby changing the relative position of the connecting plate 41, the mounting base 42, the fourth hinge rod 43 and the fifth hinge rod 44, so as to constantly change the relative position between the upper cover 1 and the lower cover 2, to open the car-top trunk.

Embodiment 4

Figure 13:
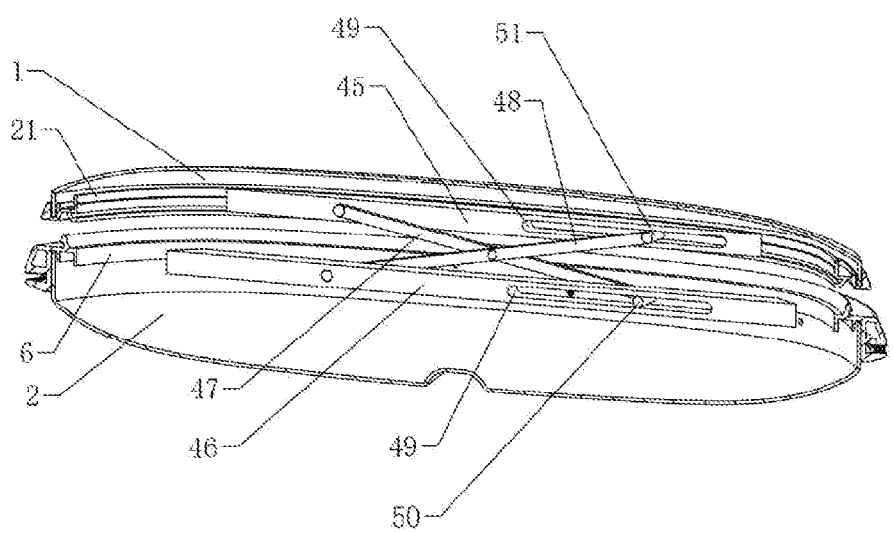
FIG. 13 is a schematic structural view for illustrating the positional relationship between the connector and the upper cover according to Embodiment 4 of the present application.
Figure 14:
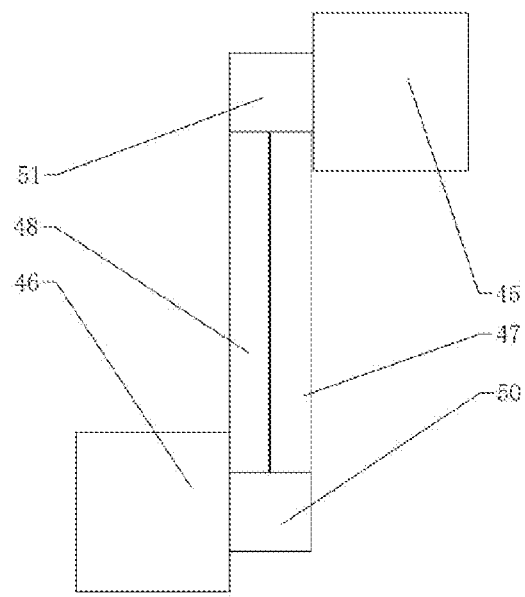
FIG. 14 is a schematic structural view for illustrating the positional relationship between the first scissor arm and the second scissor arm according to Embodiment 4 of the present application.

Referring to FIGS. 13-14, the difference between this embodiment and Embodiment 1 is that the connector includes a first link bar 45, a second link bar 46, a first scissor arm 47 and a second scissor arm 48. The first link bar 45 is provided at the upper aluminum alloy frame 21, the second link bar 46 is provided at the lower aluminum alloy frame 6, the first scissor arm 47 is hinged with the second scissor arm 48. The first link bar 45 and the second link bar 46 are respectively configured with a kidney slot. An end of the first scissor arm 47 is hinged with the first link bar 45, and the other end thereof is connected with a first sliding column 50, the first sliding column 50 is slidably inserted in the kidney slot 49 of the second link bar 46. An end of the second scissor arm 48 is hinged with the second link bar 46, and the other end thereof is connected with a second sliding column 51. The second sliding column 51 is slidably inserted in the kidney slot 49 of the first link bar 45.

The implementation principle of Embodiment 4 of the present application is as follows. When the car-top trunk needs to be opened, the upper cover 1 is pulled hard, so that the upper cover 1 drives the first link bar 45 to move, thus the angle between the first scissor arm 47 and the second scissor arm 48 is changed, the first sliding column 50 slides in its corresponding kidney slot 49, and the second sliding column 51 slides in its corresponding kidney slot 49, thereby changing the distance between the first link bar 45 and the second link bar 46, and in turn changing the distance between the upper cover 1 and the lower cover 2, to open the car-top trunk.

Embodiment 5

Figure 15:
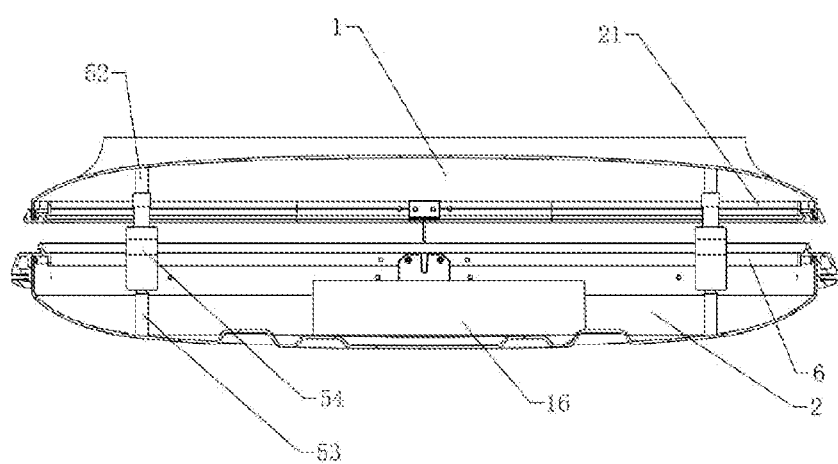
FIG. 15 is a schematic structural view for illustrating the positional relationship between the connector and the upper cover according to Embodiment 5 of the present application.

Referring to FIG. 15, the difference between this embodiment and Embodiment 1 is that the connector includes a first connecting block 52, a second connecting block 53, and a second electric push rod 54, in particular, the first connecting block 52 is connected to the upper cover 1, the second connecting block 53 is connected to the lower cover 2, the second electric push rod 54 is connected to the second connecting block 53, the push rod of the second electric push rod 54 is connected to the first connecting block 52, and the second electric push rod 54 is electrically connected to the controller 16.

The implementation principle of Embodiment 5 of the present application is as follows. When the car-top trunk needs to be opened, the second electric push rod 54 is started. The second electric push rod 54 drives the first connecting block 52 and the upper cover 1 to move in the working state, thereby changing the relative position of the upper cover 1 and the lower cover 2, to open the car-top trunk.

Embodiment 6

Figure 16:
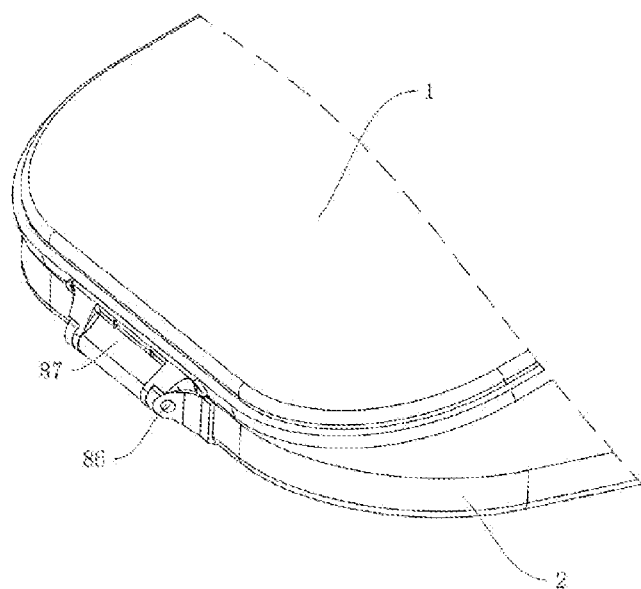
FIG. 16 is a schematic structural view for illustrating the connector configured as an outer hinge structure according to Embodiment 6 of the present application.

Referring to FIG. 16, the difference between this embodiment and Embodiment 1 is that the connector includes a rotary shaft 86 connected to the outer sidewall of the lower cover 2 and a shaft base 87 convexly provided on the upper cover 1. The shaft base 87 is bent to form an area for the rotary shaft 86 to pass through, and the rotary shaft 86 is rotationally connected to the shaft base 87.

Embodiment 7

Figure 17:
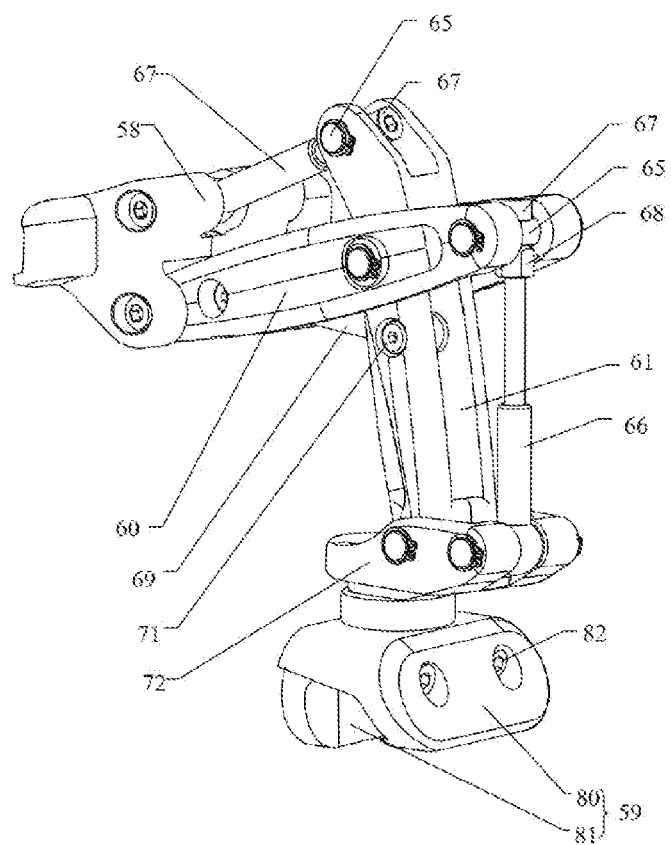
FIG. 17 is a schematic structural view for illustrating a universal support leg for mounting a car-top trunk according to Embodiment 7 of the present application.

Referring to FIG. 17, the difference between this embodiment and Embodiment 1 is that the gripper is replaced by a universal support leg, which includes a third connecting block 58, a fourth connecting block 59, a first adjusting arm 60, a second adjusting arm 61, and a locating element.

Referring to FIG. 17, the third connecting block 58 is configured for connecting the car-top trunk, a mounting threaded hole (not shown in figures) is defined on the third connecting block 58. When the car-top trunk is connected, the bolt passes through the car-top trunk and is threaded in the mounting threaded hole, thereby connecting the car-top trunk and the third connecting block 58. The shape of the third connecting block 58 can be designed according to the actual demand.

Figure 18:
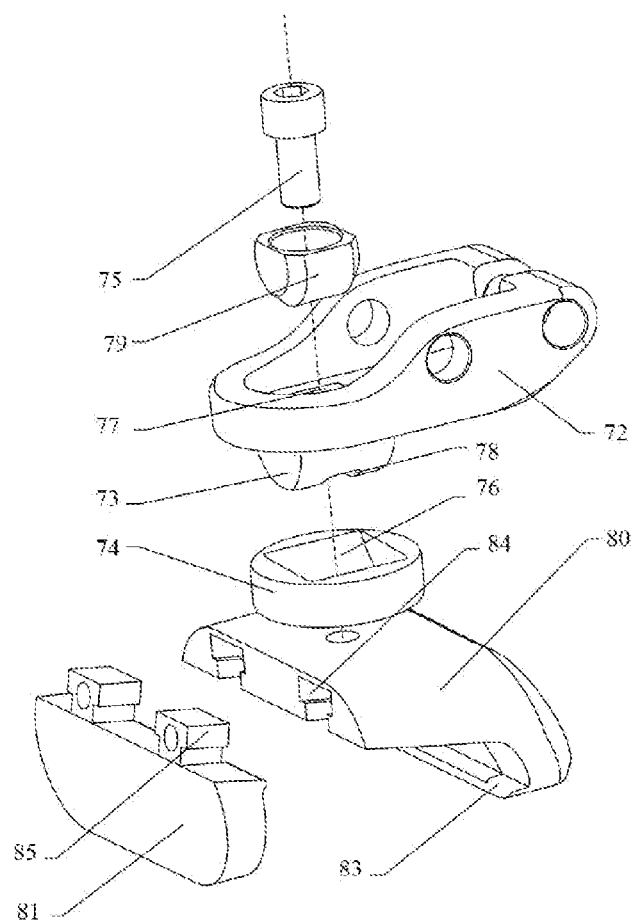
FIG. 18 is a schematic structural view for illustrating the sliding relationship between the clamping block and the positioning block according to Embodiment 7 of the present application.

Referring to FIGS. 17-18, the fourth connecting block 59 is configured for connecting a luggage rail at the top of the vehicle. The fourth connecting block 59 includes a positioning block 80 and a clamping block 81. The positioning block 80 is bent, and the clamping block 81 slidably connected to an end of the positioning block 80. A T-shaped groove 84 is defined at the positioning block 80. The clamping block 81 is connected with a T-shaped block 85, the T-shaped block 85 is integrated with the clamping block 81, and the T-shaped block 85 is configured to be located in and slidably connected to the T-shaped groove 84. The T-shaped block 85 of the clamping block 81 and the positioning block 80 are locked through a locking bolt 82, the locking bolt 82 passes through the positioning block 80 and extends in the T-shaped groove 84 to be screwed to the T-shaped block 85. Amounting space is formed between the clamping block 81 and the positioning block 80. The fourth connecting block 59 can clamp the luggage rail with the mounting space, a bulge 83 is convexly provided at an end of the positioning block 80 without the T-shaped groove 84, and the bulge extends towards the clamping block 81.

When the fourth connecting block 59 needs to be mounded on the luggage rail, the clamping block 81 is detached after unscrewing the locking bolt 82, the positioning block 80 is clamped on the luggage rail, the bulge 83 of the positioning block 80 is located under the luggage rail and abuts against the luggage rail, so that the positioning block 80 can be better clamped with the luggage rail. The T-shaped block 85 is inserted into the T-shaped groove 84, and the clamping block 81 is moved towards the positioning block 80, so that the clamping block 81 abuts against the luggage rail, then the clamping block 81 is connected to the positioning block 80 through the locking bolt 82, and the clamping block 81 and the positioning block 80 are clamped on the luggage rail via the mounting space, thereby connecting the fourth connecting block 59 and the luggage rail. During the installation process, before the locking bolt 82 is screwed, the fourth connecting block 59 can be moved in the length direction of the luggage rail of vehicle, and then the locking bolt 82 is screwed, so as to connect the fourth connecting block 59 at a proper position of the luggage rail.

Figure 19:
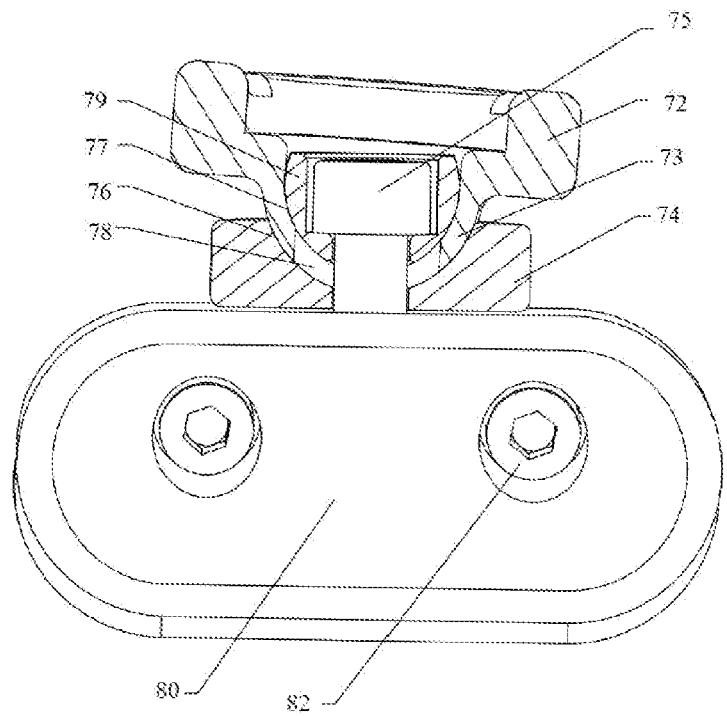
FIG. 19 is a schematic structural view for illustrating the positional relationship between the pressing casing and the rotary seat according to Embodiment 7 of the present application.

Referring to FIGS. 18-19, the fourth connecting block 59 is connected with a rotary regulator, which includes a rotary seat 72, a rotary block 73, a base 74 and a rotary bolt 75.

Figure 20:
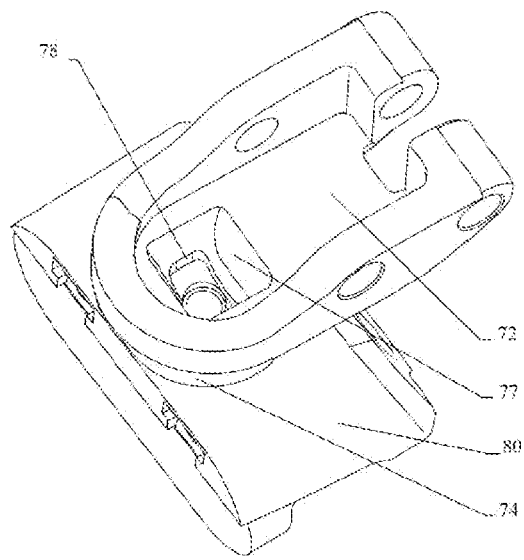
FIG. 20 is a schematic structural view for illustrating the positional relationship between the adjustment opening and the mounting recess according to Embodiment 7 of the present application.

Referring to FIGS. 18-20, the rotary block 73 is connected to the rotary seat 72, which is integrally formed with the rotary seat 72. Two opposite sides of the rotary block 73 are planes, and the outer contour of the cross-section of the rotary block 73 is arc-shaped. A depression 76 matched with the rotary block 73 in shape is defined on the base 74, and the rotary block 73 is located in the depression 76. A mounting recess 77 and an adjustment opening 78 are defined on the rotary block 73, in particular, the adjustment opening 78 is located at the bottom of the mounting recess 77 and is of arc shape, and the mounting recess 77 is an arc-shaped groove with two planes facing each other. The mounting recess 77 is internally provided with a pressing casing 79 matched with it in shape, and the rotary bolt 75 successively passes through the pressing casing 79, the adjustment opening 78 and the base 74 and is screwed to the positioning block 80.

Referring to FIG. 16, the first adjusting arm 60 is hinged with the second adjusting arm 61, the first adjusting arm 60 is hinged with the third connecting block 58, and the second adjusting arm 61 is hinged with the rotary seat 72.

Referring to FIG. 17, the locating element is configured for stabilizing the relative position between the first adjusting arm 60 and the second adjusting arm 61, the relative position between the third connecting block 58 and the second adjusting arm 61, and the relative position between the fourth connecting block 59 and the first adjusting arm 60.

Figure 21:
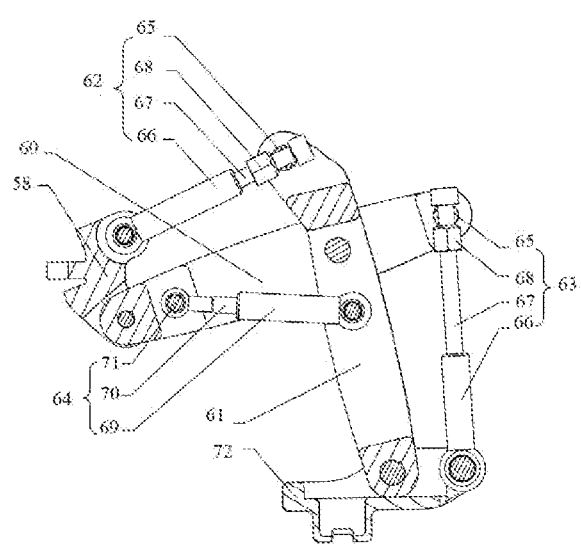
FIG. 21 is a schematic structural view for illustrating a locating element according to Embodiment 7 of the present application.

Referring to FIG. 17 and FIG. 21, the locating element is connected to the first adjusting arm 60 and the second adjusting arm 61. The locating element includes a first telescopic rod 62, a second telescopic rod 63 and a third telescopic rod 64. An end of the first telescopic rod 62 is hinged with the third connecting block 58, and the other end thereof is hinged with the second adjusting arm 61. An end of the second telescopic rod 63 is hinged with the rotary seat 72, and the other end thereof is hinged with the first adjusting arm 60. An end of the third telescopic rod 64 is hinged with the first adjusting arm 60, and the other end thereof is hinged with the second adjusting arm 61.

Referring to FIG. 17 and FIG. 21, specifically, the first telescopic rod 62 and the second telescopic rod 63 have a same structure, which includes a positioning rod 65, a positioning screw sleeve 66, a positioning bolt 67 and a positioning nut 68. By the first telescopic rod 62, the positioning screw sleeve 66 of the first telescopic rod 62 is hinged with the third connecting block 58, the positioning rod 65 is rotationally connected to the second adjusting arm 61, the positioning bolt 67 slidably passes through the positioning rod 65 and is screwed to the positioning screw sleeve 66, the positioning nut 68 is screwed to the positioning bolt 67, and the positioning nut 68 and the bolt cap of the positioning bolt 67 are located at two ends of the positioning rod 65 and abut against the positioning rod 65. By the second telescopic rod 63, the positioning screw sleeve 66 of the second telescopic rod 63 is hinged with the fourth connecting block 59, the positioning rod 65 is rotationally connected to the first adjusting arm 60, the positioning bolt 67 slidably passes through the positioning rod 65 and is screwed to the positioning screw sleeve 66, the positioning nut 68 is screwed to the positioning bolt 67, and the positioning nut 68 and the bolt cap of the positioning bolt 67 are located at two ends of the positioning rod 65 and abut against the positioning rod 65.

Referring to FIG. 17 and FIG. 21, both of the first adjusting arm 60 and the second adjusting arm 61 are detachably connected to the third telescopic rod 64. In another embodiments, it also can be provided that the end of the third telescopic rod 64 connected with the first adjusting arm 60 is detachably connected to the first adjusting arm 60, or the end of the third telescopic rod 64 connected with the second adjusting arm 61 is detachably connected to the second adjusting arm 61.

Referring to FIG. 17 and FIG. 21, the third telescopic rod 64 includes a stationary screw sleeve 69, a stationary screw rod 70 and two stationary bolts 71, one stationary bolt 71 is screwed to the first adjusting arm 60 and movably passes through the stationary screw rod 70, the other stationary bolt 71 is screwed to the second adjusting arm 61 and movably passes through the stationary screw sleeve 69, and the stationary screw rod 70 is screwed to the stationary screw sleeve 69.

The implementation principle of the support leg for car-top trunk of Embodiment of the present application is as follows. When in use, the third connecting block 58 is connected to the car-top trunk, one or two stationary bolts 71 is/are rotated to be detached, such that at least one end of the third telescopic rod 64 becomes a free end. In this embodiment, the stationary bolt 71 connected with the stationary screw sleeve 69 is detached, to release the connection between the stationary screw sleeve 69 and the second adjusting arm 61, so that the end where the stationary screw sleeve 69 is located becomes a free end. Then the positioning nuts 68 on the first telescopic rod 62 and the second telescopic rod 63 are rotated to move the positioning nut 68 to depart from the positioning rod 65, so that the limit on the positioning bolt 67 is released, and the positioning bolt 67 can move. The positioning bolt 67 is rotated to be detached from the positioning screw sleeve 66, so that the first telescopic rod 62 and the second telescopic rod 63 are respectively divided into two sections. The locking bolt 82 is unscrewed, such that the clamping block 81 is detached from the positioning block 80.

Then the rotary bolt 75 is unscrewed to be loosened, the positioning block 80 or the rotary seat 72 is rotated, such that the previous relative position between the positioning block 80 and the rotary seat 72 can be changed. The rotary seat 72 is rotated, such that the rotary block 73 can rotate in the depression 76 along the arc-shaped contour of the rotary block 73, or the rotary block 73 can rotate around the axis of the rotary bolt 75, thereby changing the relative position between the rotary seat 72 and the positioning block 80. The positioning block 80 is clamped on the luggage rail, the bulge 83 of the positioning block 80 is located under the luggage rail and abuts against the luggage rail. The T-shaped block 85 is inserted into the T-shaped groove 84, the clamping block 81 is moved to abut against the luggage rail, and the clamping block 81 is connected to the positioning block 80 through the locking bolt 82, thereby mounting the fourth connecting block 59 on the luggage rail.

During the installation process, since the third connecting block 58 is hinged with the first adjusting arm 60, the first adjusting arm 60 is hinged with the second adjusting arm 61, the second adjusting arm 61 is hinged with the rotary seat 72, the clamping block 81 is in sliding fit with the positioning block 80, the rotary block 73 can rotate in the depression 76 along the arc-shaped contour of the rotary block 73, or the rotary block 73 can rotate around the axis of the rotary bolt 75, so as to realize the adjustment of multiple angles, therefore, the car-top trunk can be mounted on the vehicles with different distances between the luggage rails, which has a wide application range and high compatibility with vehicles.

Two luggage rails at the top of different models of vehicles have different widths and heights, as well as different leaning angles and height differences between the front side and the rear side of the vehicle. Through the car-top trunk of the present application the adjustment of width, height, leaning angle and height differences between the front and rear of the vehicle can be realized, which has a variety of adaptability.

REFERENCE SIGNS LIST 1 upper cover
2 lower cover
3 water storage structure
4 battery pack
5 lighting strip
6 lower aluminum alloy frame
7 clamping groove
8 reinforcing plate
9 gripper body
10 gripper block
11 snapping groove
12 first half-groove
13 second half-groove
14 mounting groove
15 groove for lighting strip
16 controller
17 water storage container
18 pipe
19 pipe socket
water pump
21 upper aluminum alloy frame
22 recess
23 sealing groove
24 sealing strip
first electric push rod
26 electromagnetic lock
27 upper mounting plate
28 lower mounting plate
29 connecting rod I
connecting rod II
31 connecting rod III
32 connecting rod IV
33 linkage rod
34 fixing plate
sliding block
36 first hinge rod
37 second hinge rod 38 third hinge rod
39 driving rod
sliding rail
41 connecting plate
42 mounting base
43 fourth hinge rod
44 fifth hinge rod
45 first link bar
46 second link bar
47 first scissor arm
48 second scissor arm
49 kidney slot
50 first sliding column
51 second sliding column
52 first connecting block
53 second connecting block
54 second electric push rod
55 positioning groove
56 positioning block
57 intermediate plate
58 third connecting block
59 fourth connecting block
60 first adjusting arm
61 second adjusting arm
62 first telescopic rod
63 second telescopic rod
64 third telescopic rod
65 positioning rod
66 positioning screw sleeve
67 positioning bolt
68 positioning nut
69 stationary screw sleeve
70 stationary screw rod
71 stationary bolt
72 rotary seat
73 rotary block
74 base
75 rotary bolt
76 depression
77 mounting recess
78 adjustment opening
79 pressing casing
80 positioning block
81 clamping block
82 locking bolt
83 bulge
84 T-shaped groove
85 T-shaped block
86 rotary shaft
87 shaft base

What is claimed is:

1. A multifunctional car-top trunk, comprising an upper cover, a lower cover, and a connector configured for connecting the upper cover and the lower cover, wherein the multifunctional car-top trunk further comprises a water storage structure in the lower cover, the water storage structure comprises a water storage container in the lower cover and pipes, the water storage container is connected with two pipe sockets configured to be detachably connected to the pipes, one pipe is configured as an outlet pipe and is connected to a water pump, and a universal support leg configured for mounting the multifunctional car-top trunk, the universal support leg comprises a third connecting block configured to be connected to the multifunctional car-top trunk, a fourth connecting block configured to be connected to a luggage rail at a top of a vehicle, a first adjusting arm and a second adjusting arm, the first adjusting arm is hinged with the second adjusting arm, the first adjusting arm is hinged with the third connecting block, the second adjusting arm is hinged with the fourth connecting block, a locating element is connected to the first adjusting arm and the second adjusting arm, the locating element comprises a first telescopic rod, a second telescopic rod and a third telescopic rod, a first end of the first telescopic rod is hinged with the third connecting block, a second end of the first telescopic rod is hinged with the second adjusting arm, a first end of the second telescopic rod is hinged with the fourth connecting block, a second end of the second telescopic rod is hinged with the first adjusting arm, a first end of the third telescopic rod is hinged with the first adjusting arm, and a second end of the third telescopic rod is hinged with the second adjusting arm.

2. The multifunctional car-top trunk according to claim 1, further comprising a battery pack in the lower cover, wherein at least one of the upper cover or the lower cover is provided with a lighting strip, and the lighting strip is connected to the battery pack.

3. The multifunctional car-top trunk according to claim 2, wherein the connector comprises a hinge structure, a first electric push rod and an electromagnetic lock, a first end of the upper cover is connected to a first end of the lower cover through the hinge structure, a second end of the upper cover is connected to a second end of the lower cover through the electromagnetic lock, the electromagnetic lock is electrically connected to the battery pack, a first end of the first electric push rod is hinged with the lower cover, and a second end of the first electric push rod is hinged with the upper cover.

4. The multifunctional car-top trunk according to claim 3, wherein the hinge structure comprises an upper mounting plate at the upper cover, a lower mounting plate at the lower cover, a first connecting rod, a second connecting rod, a third connecting rod, a fourth connecting rod and a linkage rod at the upper mounting plate, an intermediate part of the second connecting rod is hinged with an intermediate part of the third connecting rod, a first end of the first connecting rod is hinged with a first end of the second connecting rod, a second end of the first connecting rod is hinged with the lower mounting plate, a second end of the second connecting rod departing from the first connecting rod is hinged with a first end of the linkage rod, a first end of the third connecting rod is hinged with a first end of the fourth connecting rod, a second end of the third connecting rod is hinged with the lower mounting plate, and a second end of the fourth connecting rod departing from the third connecting rod is hinged with a second end of the linkage rod departing from the second connecting rod.

5. The multifunctional car-top trunk according to claim 3, wherein the hinge structure comprises a fixing plate at the lower cover, a sliding block, a first hinge rod, a second hinge rod, a third hinge rod and a driving rod, the sliding block is slidably connected to the fixing plate, a first end of the first hinge rod is hinged with the sliding block, a second end of the first hinge rod is hinged with the driving rod, an end of the driving rod departing from the first hinge rod is connected to the upper cover, a first end of the second hinge rod is hinged with the fixing plate, a second end of the second hinge rod is hinged with the driving rod, a first end of the third hinge rod is hinged with an end of the sliding block departing from the first hinge rod, and a second end of the third hinge rod is hinged with the second hinge rod.

6. The multifunctional car-top trunk according to claim 3, wherein the hinge structure comprises a connecting plate, a mounting base, a fourth hinge rod, and a fifth hinge rod, the connecting plate is connected to the upper cover, the mounting base is connected to the lower cover, a first end of the fourth hinge rod is hinged with the connecting plate, a second end of the fourth hinge rod is hinged with the mounting base, a first end of the fifth hinge rod is hinged with the connecting plate, a second end of the fifth hinge rod is hinged with the mounting base, a length of the fifth hinge rod is greater than a length of the fourth hinge rod, and the fourth hinge rod is located between the fifth hinge rod and the first end of the lower cover close to the fifth hinge rod.

7. The multifunctional car-top trunk according to claim 1, wherein the connector comprises a first link bar, a second link bar, a first scissor arm, and a second scissor arm, the first link bar is provided at the upper cover, the second link bar is provided at the lower cover, the first scissor arm is hinged with the second scissor arm, both the first link bar and the second link bar are respectively configured with a kidney slot, a first end of the first scissor arm is hinged with the first link bar, a second end of the first scissor arm is connected with a first sliding column, the first sliding column is slidably inserted in the kidney slot of the second link bar, a first end of the second scissor arm is hinged with the second link bar, a second end of the second scissor arm is connected with a second sliding column, and the second sliding column is slidably inserted in the kidney slot of the first link bar.

8. The multifunctional car-top trunk according to claim 1, wherein the connector comprises a first connecting block, a second connecting block, and a second electric push rod, the first connecting block is provided at the upper cover, the second connecting block is provided at the lower cover, a first end of the second electric push rod is connected to the second connecting block, and a second end of the second electric push rod is connected to the first connecting block.

9. The multifunctional car-top trunk according to claim 1, wherein the connector comprises a rotary shaft connected to an outer sidewall of the lower cover and a shaft base convexly provided on the upper cover, the shaft base is bent to form an area for the rotary shaft to pass through, and the rotary shaft is rotationally connected to the shaft base.

10. The multifunctional car-top trunk according to claim 1, wherein the first telescopic rod and the second telescopic rod have a same structure, each of the first telescopic rod and the second telescopic rod comprises a positioning rod, a positioning screw sleeve, a positioning bolt and a positioning nut, by the first telescopic rod, the positioning screw sleeve of the first telescopic rod is hinged with the third connecting block, the positioning rod of the first telescopic rod is rotationally connected to the second adjusting arm, the positioning bolt of the first telescopic rod slidably passes through the positioning rod of the first telescopic rod and is screwed to the positioning screw sleeve of the first telescopic rod, the positioning nut of the first telescopic rod is screwed to the positioning bolt of the first telescopic rod, the positioning nut of the first telescopic rod and a bolt cap of the positioning bolt of the first telescopic rod are located at two ends of the positioning rod of the first telescopic rod and abut against the positioning rod of the first telescopic rod, by the second telescopic rod, the positioning screw sleeve of the second telescopic rod is hinged with the fourth connecting block, the positioning rod of the second telescopic rod is rotationally connected to the first adjusting arm, the positioning bolt of the second telescopic rod slidably passes through the positioning rod of the second telescopic rod and is screwed to the positioning screw sleeve of the second telescopic rod, the positioning nut of the second telescopic rod is screwed to the positioning bolt of the second telescopic rod, and the positioning nut of the second telescopic rod and a bolt cap of the positioning bolt of the second telescopic rod are located at two ends of the positioning rod of the second telescopic rod and abut against the positioning rod of the second telescopic rod.

11. The multifunctional car-top trunk according to claim 1, wherein the first end of the third telescopic rod configured to be connected to the first adjusting arm is detachably connected to the first adjusting arm, or the second end of the third telescopic rod configured to be connected to the second adjusting arm is detachably connected to the second adjusting arm, or both the first adjusting arm and the second adjusting arm are detachably connected to the third telescopic rod.

12. The multifunctional car-top trunk according to claim 1, wherein a rotary regulator is connected between the fourth connecting block and the second adjusting arm, the rotary regulator comprises a rotary seat, a rotary block, a base and a rotary bolt, the rotary block is connected to the rotary seat, two opposite sides of the rotary block are planes, an outer contour of a cross-section of the rotary block is arc-shaped, a depression matched with the rotary block in shape is defined on the base, a mounting recess and an adjustment opening are defined on the rotary block, the adjustment opening is located at a bottom of the mounting recess and is of arc shape, the rotary block is located in the depression, the rotary bolt successively passes through the adjustment opening and the base and is screwed to the fourth connecting block.

13. The multifunctional car-top trunk according to claim 1, wherein the fourth connecting block comprises a positioning block and a clamping block, the second adjusting arm is connected to the positioning block, the clamping block is in sliding fit with the positioning block, the positioning block and the clamping block are locked through a locking bolt, a mounting space is formed between the clamping block and the positioning block, and a bulge is convexly provided at a side of the positioning block towards the clamping block.

* * * * *